US012687029B2

(12) United States Patent

DiCello et al.

(10) Patent No.: US 12,687,029 B2
(45) Date of Patent: Jul. 21, 2026

(54) SYSTEM AND METHOD FOR REPAIRING AND/OR STRENGTHENING A POROUS STRUCTURE, AND UNIDIRECTIONAL CARBON FIBER MATERIAL FOR USE THEREWITH

(71) Applicant: Stabl-Wall, LLC, Macedonia, OH (US)

(72) Inventors: Nicholas D. DiCello, Macedonia, OH (US); Theresa DePamphilis, Macedonia, OH (US)

(73) Assignee: STABL-WALL, LLC, Macedonia, OH (US)

( * ) Notice: Subject to any disclaimer, the term of this patent is extended or adjusted under 35 U.S.C. 154(b) by 820 days.

(21) Appl. No.: 17/473,382

(22) Filed: Sep. 13, 2021

(65) Prior Publication Data

US 2022/0081920 A1      Mar. 17, 2022

Related U.S. Application Data

(60) Provisional application No. 63/077,254, filed on Sep. 11, 2020, provisional application No. 63/077,289, filed on Sep. 11, 2020.

(51) Int. Cl.
*E04G 23/02* (2006.01)
*C09D 5/00* (2006.01)
(Continued)

(52) U.S. Cl.
CPC ......... *E04G 23/0203* (2013.01); *C09D 5/002* (2013.01); *C09J 163/00* (2013.01); *C09K 3/1028* (2013.01); *E04C 5/07* (2013.01); *E04C*

*5/073* (2013.01); *E04G 23/0229* (2013.01); *C09K 2003/1059* (2013.01); *E04G 2023/0251* (2013.01)

(58) Field of Classification Search
CPC ....... E04C 5/07; E04C 5/073; E04G 23/0203; E04G 23/0229; E04G 2023/0251; C09D 5/002; C09J 163/00; C09K 3/1028; C09K 2003/1059
See application file for complete search history.

(56) References Cited

U.S. PATENT DOCUMENTS 4,352,262 A * 10/1982 Edelmann ........... E04G 23/0211
52/742.16
6,418,684 B1 * 7/2002 Morton ............... E04G 23/0218
52/309.1
(Continued)

FOREIGN PATENT DOCUMENTS

EP 2192233 A1 * 6/2010 .......... E01D 19/083
JP 2018071302 A * 5/2018
WO WO-2011003927 A1 * 1/2011 .......... E01D 19/083

*Primary Examiner* — Jessie T Fonseca
(74) *Attorney, Agent, or Firm* — McDonald Hopkins LLC

(57) ABSTRACT

A system and method for repairing and/or strengthening a structure. The system may include an epoxy paste filler, a primer, an saturant/bonding adhesive, and a unidirectional carbon fiber. The method may include application of a paste filler, a primer, a bonding saturant and a unidirectional carbon fiber. The carbon fiber may be applied between application of a first bonding saturant layer and a second bonding saturant layer. The amount and/or length of the unidirectional carbon fiber may be based on the type of damage (e.g., the type and/or location of a crack) to the structure.

14 Claims, 11 Drawing Sheets

(51) Int. Cl.

| | | |
|---|---|---|
| *C09J 163/00* | (2006.01) | |
| *C09K 3/10* | (2006.01) | |
| *E04C 5/07* | (2006.01) | |

(56) References Cited

U.S. PATENT DOCUMENTS

| | | | | |
|---|---|---|---|---|
| 8,567,146 | B2 * | 10/2013 | Hemphill | B32B 3/02 |
| | | | | 52/582.1 |
| 8,584,431 | B2 * | 11/2013 | Secrest | E04B 1/38 |
| | | | | 52/745.1 |
| 8,697,190 | B2 * | 4/2014 | Evanson | B28B 11/04 |
| | | | | 427/532 |
| 9,290,956 | B1 * | 3/2016 | Wheatley | F16B 13/00 |
| 9,290,957 | B1 * | 3/2016 | Wheatley | E04G 23/0229 |
| 9,546,490 | B2 * | 1/2017 | Kraus | E04G 23/0218 |
| 9,790,697 | B2 * | 10/2017 | Wheatley | E04B 1/98 |
| 10,494,826 | B1 * | 12/2019 | Wheatley | E04G 23/0229 |
| 10,801,221 | B2 * | 10/2020 | Secrest | E04G 23/0288 |
| 10,858,850 | B2 * | 12/2020 | Wheatley | E04G 23/0218 |
| 2012/0073231 | A1 * | 3/2012 | Hemphill | B32B 3/30 |
| | | | | 52/514 |
| 2014/0137503 | A1 * | 5/2014 | Wheatley | E04G 23/0211 |
| | | | | 156/94 |
| 2014/0144095 | A1 * | 5/2014 | Blaszak | D03D 13/00 |
| | | | | 52/514 |
| 2015/0167332 | A1 * | 6/2015 | Shiota | E04G 23/0218 |
| | | | | 52/514 |
| 2015/0300033 | A1 * | 10/2015 | Weber | E04G 23/0203 |
| | | | | 52/514 |
| 2019/0010719 | A1 * | 1/2019 | Secrest | E04G 23/0288 |
| 2022/0259876 | A1 * | 8/2022 | Secrest | E04B 2/16 |

* cited by examiner

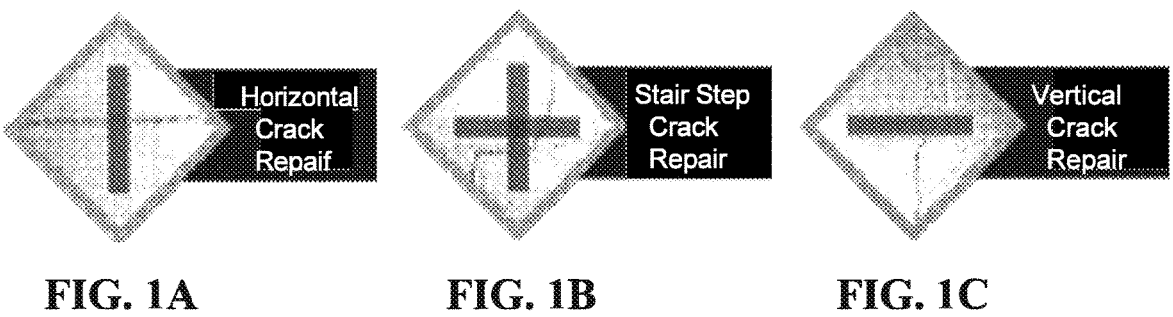
FIG. 1A          FIG. 1B          FIG. 1C
TOP OF WALL
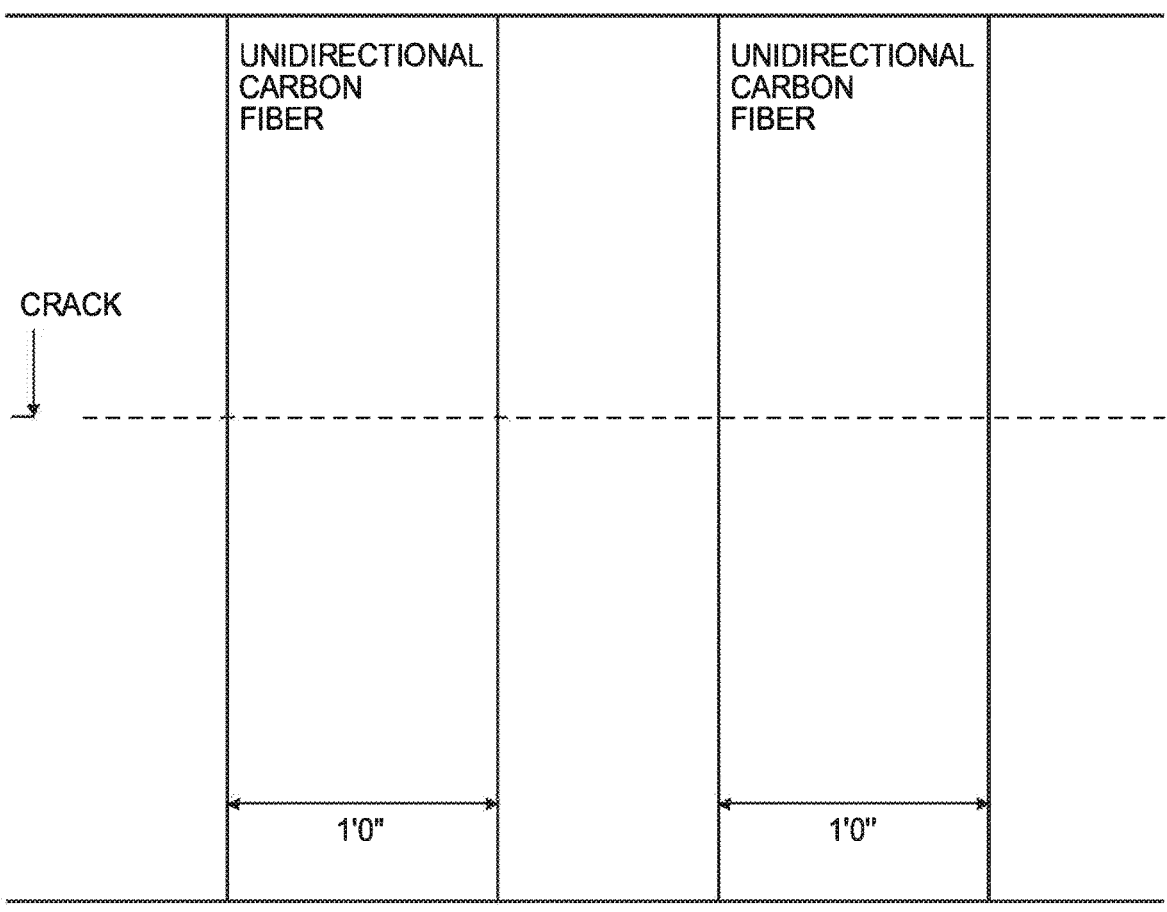
FLOOR
FIG. 2

TOP OF WALL

FLOOR

TOP OF WALL

UNIDIRECTIONAL
CARBON
FIBER

UNIDIRECTIONAL
CARBON
FIBER

1'0"

1'0"

FLOOR

OUTSIDE CORNER WRAP - FLOOR NOT VISIBLE IN DIAGRAM

130
Prepare epoxy paste filler

135
Apply epoxy paste filler to cover/fill defects in marked area

140
Allow epoxy paste filler time to set enough to thicken

145
Prepare primer

150
Apply the primer over the epoxy paste filler in the marked areas

155
Allow the primer to set to absorb into porous surface of marked areas

FIBER PROPERTIES

| | English | Metric | Test Method |
|---|---|---|---|
| Tensile Strength | 711 ksi | 4,900 MPa | TY-0308-01 |
| Tensile Modulus | 33.4 Msi | 230 GPa | TY-0308-01 |
| Strain | 2.1% | 2.1% | TY-0308-01 |
| Density | 0.065 lbs/in³ | 1.80 g/cm³ | TY-0308-02 |
| Filament Diameter | 2.8E-04 in. | 7 μm | |
| Yield    5K | 3,724 ft/lbs | 400 g/1000m | TY-0308-03 |
|            12K | 1,863 ft/lbs | 800 g/1000m | TY-0308-03 |
|            24K | 903 ft/lbs | 1,850 g/1000m | TY-0308-03 |
| Sizing Type & Amount    50C | 1.0% | | TY-0308-05 |
|            60E | 0.3% | | TY-0308-05 |
|            F0E | 0.7% | | TY-0308-05 |
|            Twist | Never Twisted | | |

FUNCTIONAL PROPERTIES

| | |
|---|---|
| CTE | -0.38 a·10⁻⁶/°C |
| Specific Heat | 0.18 Cal/g·°C |
| Thermal Conductivity | 0.0224 Cal/cm·s·°C |
| Electric Resistivity | 1.6 x 10⁻³ Ω·cm |
| Chemical Composition: Carbon | 93% |
|            Na + K | <50 ppm |

COMPOSITE PROPERTIES*

| | English | Metric | |
|---|---|---|---|
| Tensile Strength | 370 ksi | 2,550 MPa | ASTM D-3039 |
| Tensile Modulus | 20.0 Msi | 135 GPa | ASTM D-3039 |
| Tensile Strain | 1.7% | 1.7% | ASTM D-3039 |
| Compressive Strength | 215 ksi | 1,470 MPa | ASTM D-695 |
| Flexural Strength | 245 ksi | 1,670 MPa | ASTM D-790 |
| Flexural Modulus | 17.5 Msi | 120 GPa | ASTM D-790 |
| ILSS | 13 ksi | 9 kgf/mm² | ASTM D-2344 |
| 90° Tensile Strength | 10.0 ksi | 69 MPa | ASTM D-3039 |

| TOW SIZES | TWIST | SIZING | BOBBIN NET WEIGHT (kg) | BOBBIN TYPE | BOBBIN SIZE b | c | d | e | SPOOLS PER CASE | CASE NET WEIGHT (kg) |
|---|---|---|---|---|---|---|---|---|---|---|
| 6k | C | 50C | 2.0 | III | 76.5 | 82.5 | 280 | 140 | 252 | 12 | 24 |
| | C | 50C | 6.0 | III | 76.5 | 82.5 | 280 | 200 | 252 | 4 | 24 |
| 12k | C | 60E | 6.0 | III | 76.5 | 82.5 | 280 | 200 | 252 | 4 | 24 |
| | C | F0E | 6.0 | III | 76.5 | 82.5 | 280 | 200 | 252 | 4 | 24 |
| | C | 50C | 6.0 | III | 76.5 | 82.5 | 280 | 200 | 252 | 4 | 24 |
| 24k | C | 60E | 6.0 | III | 76.5 | 82.5 | 280 | 200 | 252 | 4 | 24 |
| | C | F0E | 6.0 | III | 76.5 | 82.5 | 280 | 200 | 252 | 4 | 24 |

1. Twist  A: Twisted yarn  B. Untwisted yarn made from a twisted yarn though an untwisting process. C. Never twisted yarn
2. Bobbin Type: See Diagram below.

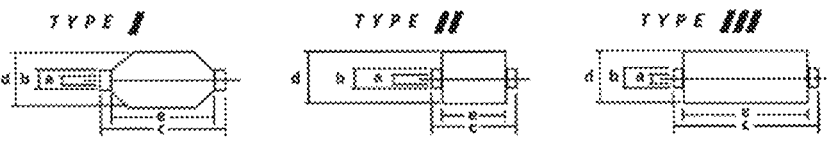

TYPE I    TYPE II    TYPE III

FIG. 11

SYSTEM AND METHOD FOR REPAIRING AND/OR STRENGTHENING A POROUS STRUCTURE, AND UNIDIRECTIONAL CARBON FIBER MATERIAL FOR USE THEREWITH

CROSS-REFERENCE TO RELATED APPLICATIONS

This application claims the benefit of U.S. Provisional Application No. 63/077,254, filed on Sep. 11, 2020 entitled SYSTEM AND METHOD FOR REPAIRING AND/OR STRENGTHENING A POROUS STRUCTURE and U.S. Provisional Application No. 63/077,289, filed on Sep. 11, 2020 entitled UNIDIRECTIONAL FIBER FOR STRUCTURAL STRENGHTING SYSTEMS, the contents of which are incorporated herein by reference in their entireties.

TECHNICAL FIELD

The innovation pertains to a system and method for repairing and/or strengthening a wall, or a structure or portions thereof. The system or method includes application of epoxy and resins in combination with a unidirectional carbon fiber.

BACKGROUND

In many cases, a foundation for a structure may be damaged by moisture leaking against the exterior walls of the structure from the surrounding earth. In addition, pressure from the surrounding earth may cause structural damage (e.g., cracks, bowing, shifting). This pressure may be increases in climates in which the ground freezes.

Traditional methods of foundation repair and/or stabilization are only partially successful at restraining a wall from further movement and cracking. Typically, injection of epoxy into a developed crack would be used to repair a damaged foundation and/or wall. After a period of time during which the wall or foundation can continue to shift, the epoxy injection into the crack may break, thus, requiring additional repair and/or stabilization.

SUMMARY OF THE INVENTION

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

According to an aspect, the innovation provides a system for repairing and/or strengthening a structure. The system may include a paste filler, a primer, and a bonding saturant. A unidirectional carbon fiber may be used with the system.

According to an aspect, the innovation provides a unidirectional carbon fiber material comprising a plurality of thin carbon fibers, in a parallel alignment, that are tightly woven into a fabric material. When the material is installed/applied to a wall, it is impregnated with a bonding adhesive that bonds the carbon fibers to each other and becomes one with the wall. These fibers are highly resistant to stretching—ten times as resistant as steel at the same thickness such as but not limited to about 1.35 mm, or in a range of about 1.30 mm-1.40 mm. Once applied, the crack cannot or will not move (i.e., will not shift or worsen) because the bond will not stretch.

According to an aspect, the innovation provides a method for repairing and/or strengthening a structure (e.g., a foundation or a wall). The method may include a system for repairing and/or strengthening a structure. The system may include a paste filler, a primer, and a bonding saturant. A unidirectional carbon fiber may be used with the system. In turn, the amount of each epoxy/resin needed to repair and/or strengthen the structure may be based on the amount of and/or configuration of the unidirectional carbon fiber.

BRIEF DESCRIPTION OF THE DRAWINGS

FIGS. 1A-1C are illustrations of the configuration of unidirectional carbon fiber material according to an embodiment of the innovation. FIG. 1A is an illustration of a configuration used to repair a horizontal crack. FIG. 1B is an illustration of a configuration used to repair a stair-step crack. FIG. 1C is an illustration of a configuration used to repair a vertical crack.

FIG. 2 is a photograph depicting repair of a horizontal crack using the epoxy paste, primer, and bonding saturant system, including unidirectional carbon fiber material of an embodiment according to the innovation.

FIG. 11 is an embodiment of unidirectional carbon fiber material.

DETAILED DESCRIPTION

Figure 3:
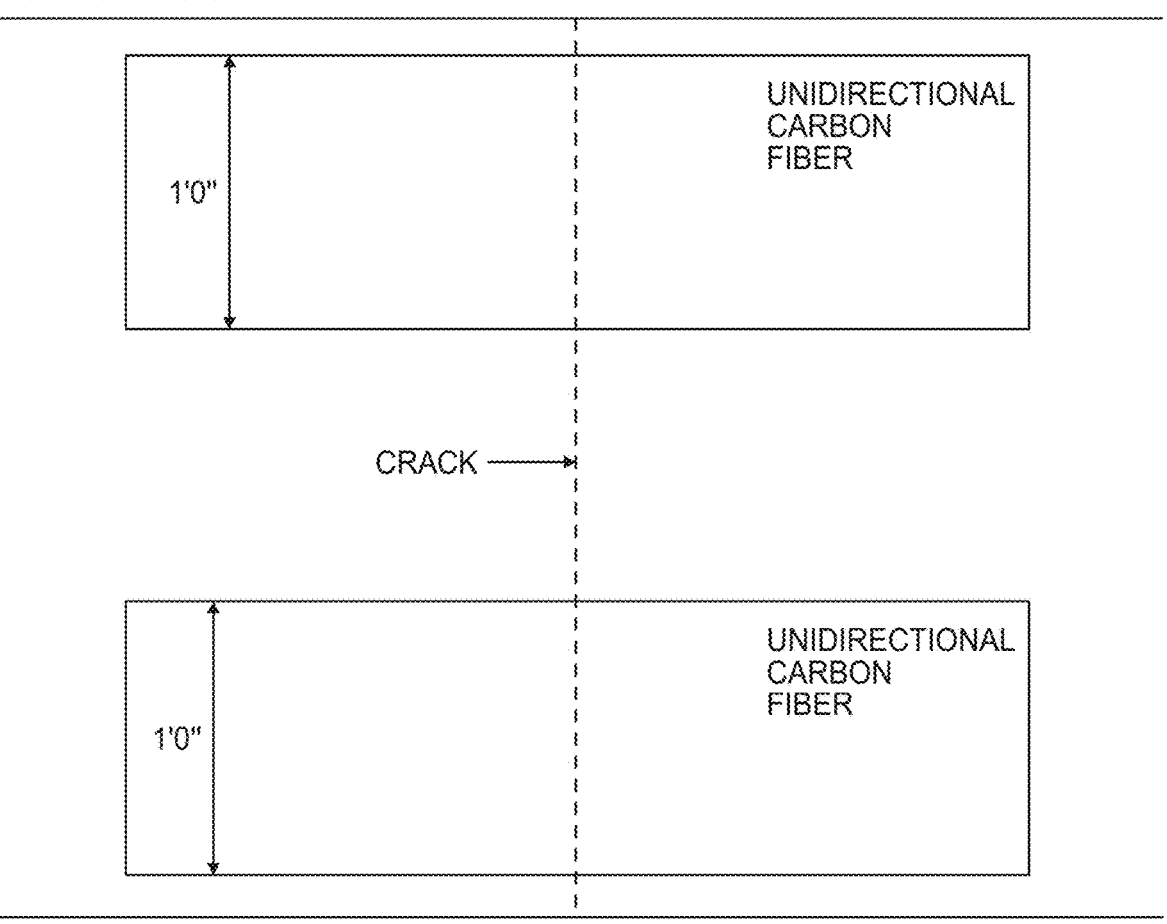
FIG. 3 is a photograph depicting repair of a vertical crack using the system of the present innovation, including unidirectional carbon fiber material of an embodiment according to the innovation.

A foundation or wall for a structure may incur damage from, among other forces, the pressure of earth against the exterior walls of a foundation. For example, the earth pressure may cause a concrete block (or clay title in older foundations) to crack and bow inward. Cracks may be classified as stair-step, vertical, diagonal, or horizontal.

In addition to normal pressures, the pressure from the ground freezing may cause further damage. In particular, ground freezing is more likely to cause horizontal cracks in mortar joints. Often this occurs in the area between 16 inches and 40 inches below the exterior grade of earth. The magnitude of the pressure from freezing cannot easily be determined, but combined with the earth pressure clearly exceeds the ability of an unreinforced masonry wall to resist these forces.

According to an embodiment, the innovation provides an epoxy-resin/carbon fiber system for repairing and/or strengthening a structure (e.g., a wall or foundation). In one embodiment, the structure may be part of a residential or commercial building. Such a system provides a less labor intensive and less invasive way to address the reason for the cracking, and lack of tensile strength. In one embodiment, the innovation may provide an epoxy/resin system for repairing cracks in porous surfaces such as cement (e.g., cement blocks), concrete (e.g., poured concrete), brick, concrete masonry unit (CMU), and poured walls. The system may be used to repair cracks for wall and/or foundation stabilization. The system may also be used to add structural strength to such surfaces and/or structures. The system includes a unidirectional carbon fiber material.

In one embodiment, the innovation provides an epoxy/resin unidirectional carbon fiber system. In one embodiment, the amount of epoxy/resin used is determined by the quantity (i.e., number of sheets) and/or length of the sheets and/or width of the sheets of the unidirectional carbon fiber. Once cured, this combination of unidirectional carbon fiber has a tensile strength that is ten times stronger than steel. In one embodiment, the amount of epoxy/resin used in the system is calculated based on the amount of carbon fiber used, such as number of sheets and/or length of the sheets and/or width of the sheets of the unidirectional carbon fiber.

According to an aspect, the innovation provides a system and method for repairing/strengthening a weakened area of a surface (e.g., a wall, slab, or concrete surface). In one embodiment, the method may include preparing the surface for application of a first epoxy paste filler. The surface may be prepared by abrasion techniques conventional in the art, such as but not limited to mechanical abrasion. Abrading the surface may remove extraneous material/detritus and may allow for greater adhesion of the epoxy to the desired surface and/or structure. In one embodiment, the surface may be abraded using an abrasive tool (e.g., a sander). In one embodiment, the abrasive tool may be a diamond tipped sander, such as a 4-6 inch diamond tipped sander. It is to be appreciated that any suitable means for abrading the surface may be used. Other suitable means for abrasion include an abrasive blast including sandblasting techniques as may be understood in the art that may be most appropriate for the target surfaces material, such as brick, concrete, metal, steel and the like.

In embodiments in which the structure comprises poured concrete or brick, additional epoxy paste filler may be required.

Once the surface is prepared, an epoxy paste/filler may be applied to the area to be repaired/strengthened. In one embodiment, the epoxy paste/filler is applied before any remaining component of the system (e.g., any other resin or epoxy). The epoxy paste may be used to level small surface defects and/or provide a smooth surface for application of other components of the system.

In one embodiment, a fast-setting hydraulic cement or a polyurethane expandable foam filler may be used to fill large cracks/defects.

The epoxy paste may be a high viscosity epoxy paste. In one embodiment, the epoxy paste may be a 100% solids non sag epoxy paste. The epoxy paste may be used to level surface defects and to provide a smooth surface for application of the remaining agents of the epoxy system. The epoxy paste may be prepared at the time of application by combining the epoxy (Part A) and a hardener (Part B) in a mix ratio of about 3:1 by volume or 100:30 by weight (epoxy:hardener). For the most efficient use of material, only the amount of material that can be used within the working time for the epoxy paste is mixed at a time. For example, approximate working times for a 1 gallon (3.8 L) of an epoxy paste according to the innovation is about 95 minutes at 50° F. or greater; about 40 minutes at 77° F. and 15 minutes at 90° F.

In one embodiment, the epoxy paste filler may be prepared by pre-mixing the epoxy (Part A) before combining with the hardener (Part B). The epoxy paste filler may be mixed by hand for approximately 40-60 stirs until thoroughly mixed at which time the hardener may be added. The mixture should be thoroughly combined. In one embodiment, the mixture may be combined using an electric mixer or an epoxy mixing paddle attached to a power drill (e.g., a Jiffy Mixer) for approximately 45-60 seconds on a low speed generally considered conventional in the art. It is to be appreciated that any method of mixing may be utilized.

In one embodiment, a primer may be applied before or after the epoxy paste/filler has set. More particularly, in an embodiment, the epoxy paste filler is applied first and subsequently the primer is applied in a wet-on-wet application. The primer may be used to penetrate the pore structure of the substrate to be repaired/strengthened. It may also provide a high bond base coat for application of other components of the system. In one embodiment, the primer is applied within about 48 hours of the application of the epoxy paste. In one embodiment, the primer may be applied within 5-10 minutes after application of the epoxy paste is complete, or even minimal to no wait time between said steps.

The primer may be a low viscosity resin. In one embodiment, the primer may be a low viscosity polyamine cured epoxy. The primer may be applied to the prepared surface such that it penetrates the pore structure of the surface to be repaired/strengthened. Application of the primer may provide a high bond base coat for application of the remainder of the strengthening system.

The primer may be prepared at the time of application by combining a resin (Part A) and a hardener (Part B) in a mix ratio of about 3:1 by volume or 100:30 by weight (resin:hardener). For the most efficient use of material, only the amount of material that can be used within the working time for the primer is mixed at a time may be employed. For example, approximate working times for a 1 gallon (3.8 L) of an primer according to the innovation is about 75 minutes at 50° F. or greater; about 20 minutes at 77° F. and 10 minutes at 90° F. In one embodiment, the primer may be allowed to set for at least about 5-10 minutes before application of any other components, or even minimal to no wait time between said steps as a wet-on-wet application system.

In one embodiment, the primer may be prepared by pre-mixing the resin (Part A) before combining it with the hardener (Part B). The primer may be mixed by hand for approximately 40-60 stirs until thoroughly mixed at which time the hardener may be added. The mixture should be thoroughly combined. In one embodiment, the mixture may be combined using an electric mixer or an epoxy mixing paddle attached to a power drill (e.g., a Jiffy Mixer) for approximately 45-60 seconds. It is to be appreciated that any method of mixing may be utilized.

In one embodiment, after application of the primer and the epoxy paste, a saturant/bonding adhesive may be applied to the area to be repaired/strengthened. The saturant may be an encapsulation resin. In one embodiment, the saturant is a 100% solids, low to moderate viscosity resin material. In one embodiment, the bonding adhesive is a tack-free saturant. Once the bonding saturant is tack free, it may be lightly abraded.

The bonding adhesive/saturant may be used to encapsulate the carbon fiber material of the structural strengthening system, as well as glass and aramid fiber fabrics. When reinforced with fiber fabrics, the saturant cures to provide a high performance carbon fiber reinforced polymer (CFRP) laminate.

In one embodiment, the carbon fiber material may include unidirectional carbon fiber. The carbon fiber material is applied after a first coat of the bonding saturant. It should be appreciated that any air bubbles may be removed after application by use of a rib roller or any comparable roller or device conventional in the art. Once applied, a second coat of the bonding saturant may be applied over the carbon fiber material. It should be appreciated that any air bubbles are removed after said subsequent application step such as by use of a rib roller or any comparable roller device conventional in the art.

In one embodiment, the bonding adhesive/saturant may be prepared at the time of application by combining a resin (Part A) and a hardener (Part B) in a mix ratio of about 3:1 by volume or 100:30 by weight (resin:hardener). For the most efficient use of material, only the amount of material that can be used within the working time for the saturant is mixed at a time. For example, approximate working times for a 1 gallon (3.8 L) of an saturant according to the innovation is about 200 minutes at 45° F.; about 20 minutes at 77° F. and 15 minutes at 90° F.

In one embodiment, the bonding adhesive/saturant may be prepared by pre-mixing the resin at 40-60 stirs (Part A) before combining it with the hardener (Part B). It should be understood and appreciated that the paste filler employed with the system of the present innovation is a non-homogenous paste filler. In accordance with the system of the present innovation, the bonding adhesive/saturant may be thoroughly mixed by hand for approximately 40-60 stirs or may be mixed with an electric mixer or an epoxy mixing paddle attached to a power drill (e.g., a Jiffy Mixer) for 45-60 seconds. It is to be appreciated that any method of mixing may be used.

Once the resin is thoroughly mixed, the hardener may be added. The two parts may be combined by hand for approximately 40-60 stirs or may be mixed with an electric mixer or an epoxy mixing paddle attached to a power drill for about 45-60 seconds. It is to be appreciated that any method of mixing may be used.

In one embodiment, the saturant may be applied while the primer is still wet. In one embodiment, the saturant may be applied while the primer is still tacky. In one embodiment, the saturant may be applied immediately after application of the primer.

In one embodiment, both the saturant and the primer are applied within about 48 hours of the application of the epoxy paste.

In one embodiment, the primer/epoxy paste coat is tack-free. Prior to application of the saturant over the tack-free primer/epoxy paste coat, the tack-free coat may be lightly abraded.

In one embodiment, the epoxy/resin system may further include application of a unidirectional carbon fiber material over at least a first coat of the saturant. The unidirectional carbon fiber material may comprise high strength, standard modulus fiber. In one embodiment according to the innovation, the unidirectional carbon fiber material may include the properties as set forth in Table 1.

In an embodiment, the carbon fiber tensile strength may be 152.8 KSI and the tensile modulus may be 12.42 MSI with a thickness (tf) of 0.038".

The unidirectional carbon fiber may comprise a 4 oz, 9 oz or 11 oz/sq yd fiber. In one embodiment, the unidirectional carbon fiber material may comprise an 11 oz/sq yd fiber. In one embodiment, the unidirectional carbon fiber may comprise a fiber that is not twisted. The unidirectional carbon fiber may be woven with robust edges on both sides and without gaps in the weave. The fiber may have a standard thickness in a range of about 0.005 inches to about. 025 inches. The fiber may have a standard thickness of about 0.0006 inches, about 0.009 inches, 0.015 inches, or about 0.023 inches. In one embodiment, the fiber may have a standard thickness of about 0.015 inches. Here as elsewhere in the specification and claims, ranges and values can be combined to form new and non-disclosed ranges.

Figure 4:
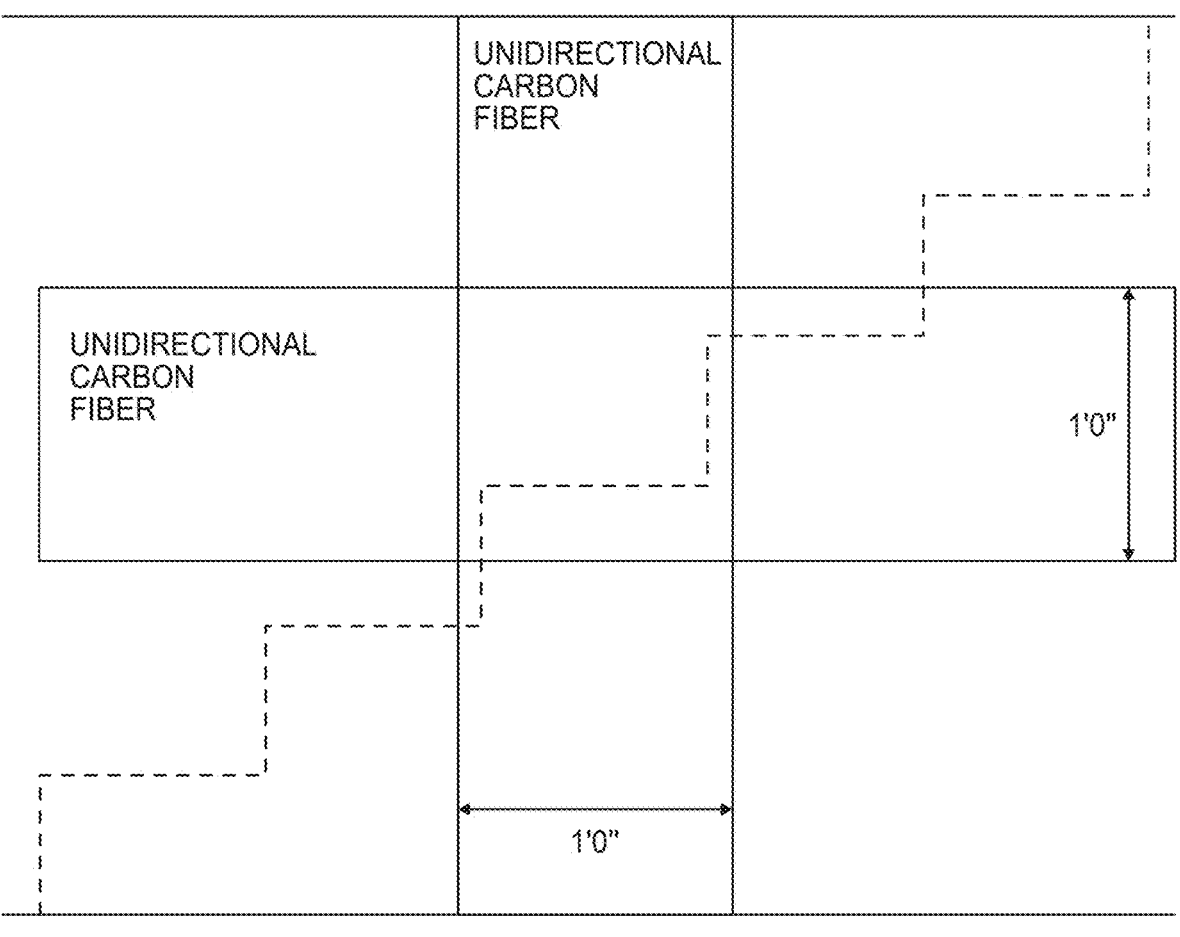
FIG. 4 is a photograph depicting repair of a stair-step crack using the system of the present innovation, including unidirectional carbon fiber material of an embodiment according to the innovation.
Figure 5:
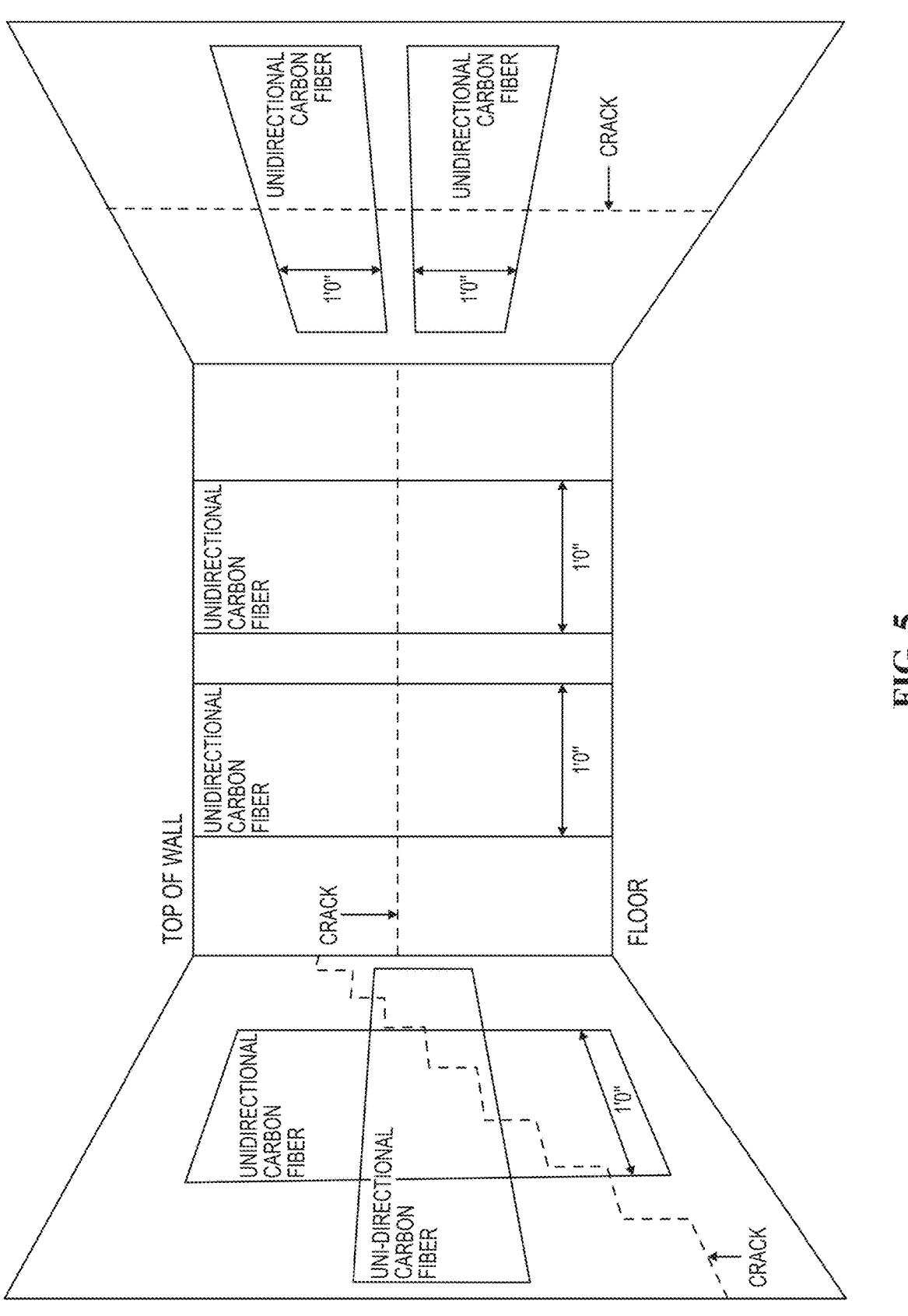
FIG. 5 is an illustration of a use of the epoxy/resin system and unidirectional carbon fiber material on various defects in embodiments according to the innovation.

The unidirectional carbon fiber may be used to repair defects (e.g., cracks) and/or for structural strengthening. In one embodiment, the unidirectional carbon fiber may be applied opposite to the crack. For example, the unidirectional carbon fiber may be placed vertically over a horizontal crack as shown in FIG. 1A and FIG. 2. In another example, the unidirectional carbon fiber may be applied both vertically and horizontally in a more-or-less cross-shape over a stair step crack as shown in FIG. 1B and FIG. 4. In yet another example, the unidirectional carbon fiber may be used to repair/strengthen a vertical crack by applying the unidirectional carbon fiber horizontally as shown in FIG. 1C and FIG. 3. In another example, a diagonal crack may be repaired/strengthened by applying the unidirectional carbon fiber as show in FIG. 6. In one embodiment, the unidirectional carbon fiber may be used for structural strengthening even in the absence of cracking.

Figure 7A:
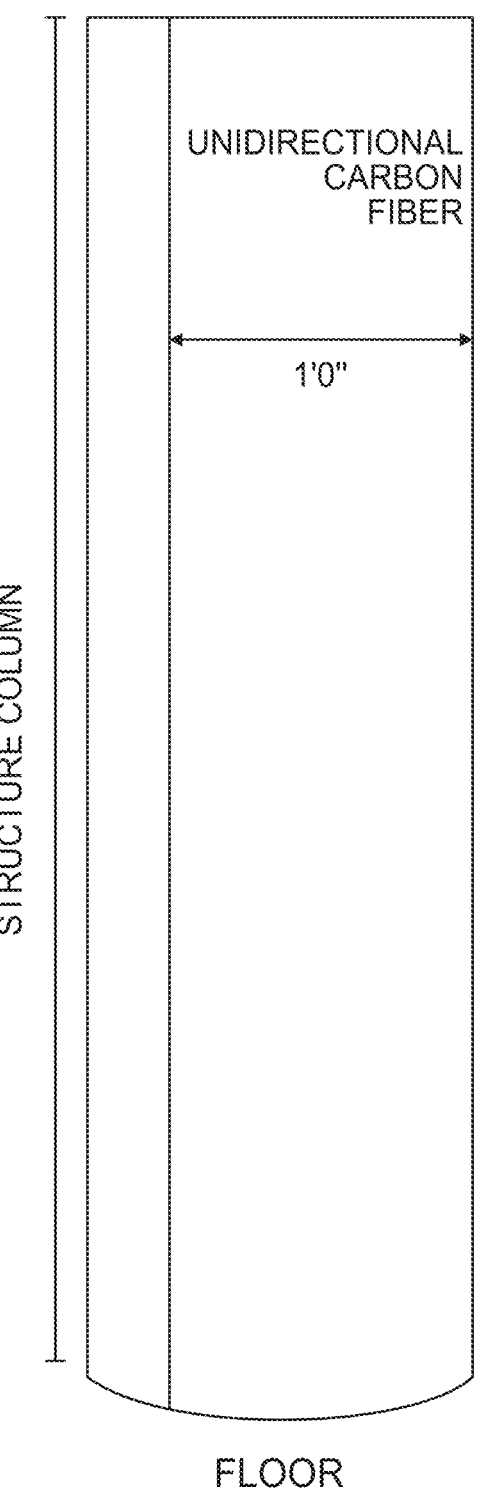
FIGS. 7A and 7B are photographs depicting an examples of applications of embodiments according to the innovation on non-flat structures.
Figure 7B:
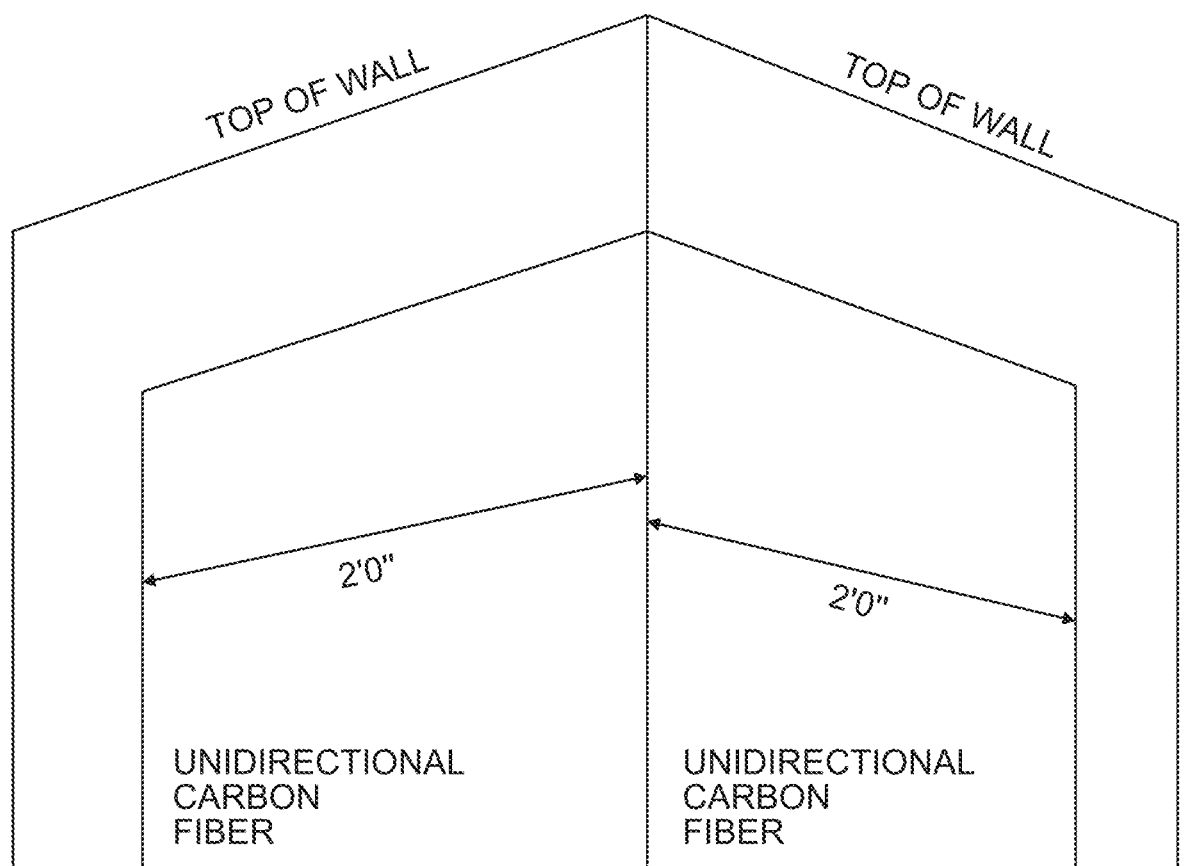

In one embodiment, the unidirectional carbon fiber may be used to repair/strengthen a structure that is not flat (i.e., not the surface of a wall). As depicted in FIGS. 7A and 7B, the system may be used to strengthen/repair structures that are curved (e.g., a column as in FIG. 7A) or around corners as shown in FIG. 7B. It is to be appreciated that these are examples of structures that can be strengthened/repaired and that the system and method described herein can be used in other configurations.

In one embodiment, the amount of carbon fiber used may be used to calculate the appropriate amount of epoxy/resin to apply. Various factors may be considered when determining the amount of carbon fiber material needed for a given application. Factors to consider include the need for the repair/strengthening including whether movement or cracking needs to be stopped/mitigated. It should be appreciated too that the source of the underlying problem ideally should be addressed separately prior to administration of the system of the present innovation. Other factors include the type of surface that needs coverage and the severity of defects (e.g., cracks, bowing, movement, etc.).

According to an aspect, in one embodiment, a structure may be repaired/strengthened by preparing the surface for application of the epoxy/resin structural strengthening system, including the unidirectional carbon fiber material. The surface can be prepared by grinding the surface to provide for greater adhesion. In one embodiment, a diamond tipped sander may be used to open the pores of the structure (e.g., a concrete wall) such as described above. Parts A and B of an epoxy paste/filler may be mixed and feathered over the crack and mortar joints. Primer parts A and B may then be mixed and rolled over the opened-up area after the epoxy paste has had some time to set (e.g., for up to about 5 minutes). While the primer is still tacky, the saturant/bonding adhesives parts A and B are mixed and applied over the primer. The fiber is applied over the primer/bonding adhesive, air bubbles rolled out, and a final coating of the bonding adhesive is applied on top, then rib-rolled over again to remove any remaining air pockets. This results in encapsulation of the unidirectional carbon fiber material.

In one embodiment, the structural strengthening system may be used to repair structural cracks in a structure. For example, the structural strengthening system, including carbon fiber, may be used to add strength and stability to a repair once the cause/source of structural crack is identified and resolved. In one embodiment, the structural strengthening system may prevent further cracking.

According to an aspect, the epoxy/resin system may be used to prevent/repair cracks and/or strengthen/stabilize most any concrete or porous surface such as bricks, CMU, and poured walls of buildings. The epoxy/resin system may also be used in other applications including, but not limited to repairs/strengthening of box beams, bridge columns, parking decks, slab reinforcement, shear walls, and the like.

Figure 8:
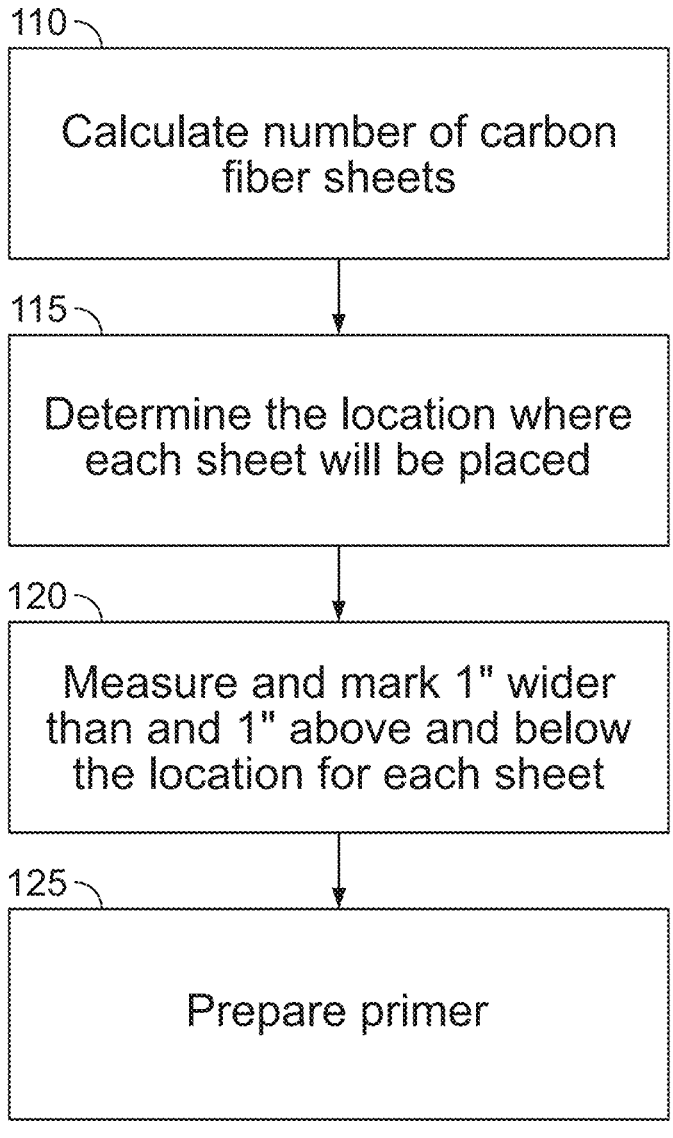
FIG. 8 is a flow chart diagram of a method of preparing a structure according to an embodiment of the innovation.
Figure 9:
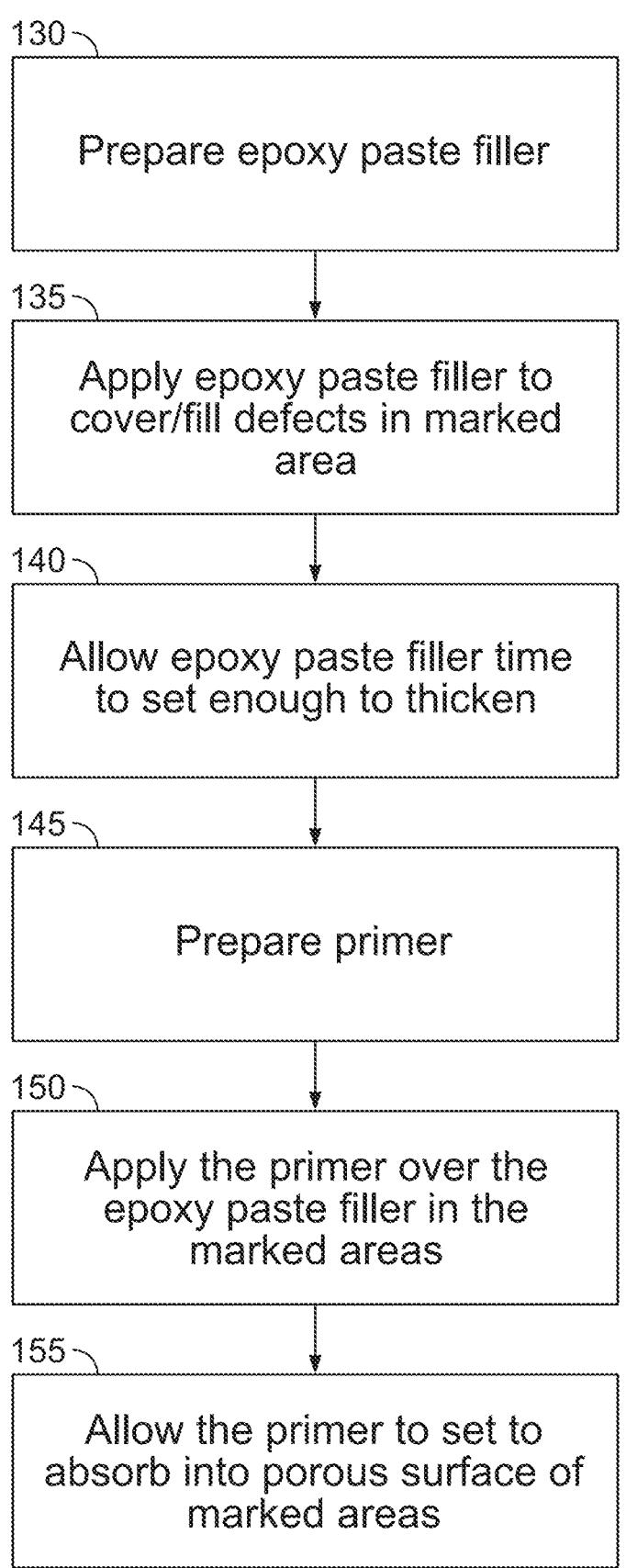
FIG. 9 is a flow chart diagram of a method of preparing and applying the epoxy past filler and the primer according to an embodiment of the innovation.
Figure 10:
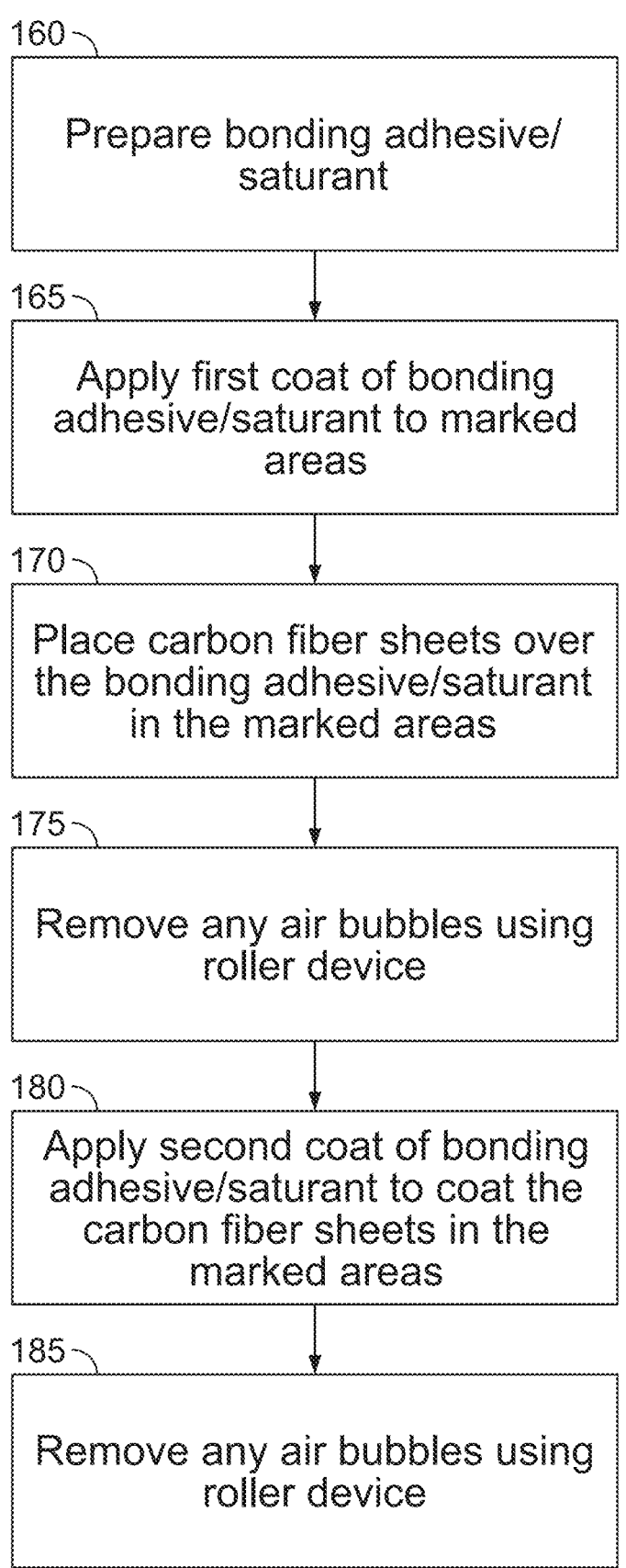
FIG. 10 is a flow chart diagram of a method of preparing and applying the saturant.

According to an aspect, a method of repairing and/or strengthening a structure is provided. FIGS. 8-10 depict flow chart diagrams of aspects of an embodiment according to the innovation. In one embodiment, the method may include calculating 110 the amount of unidirectional carbon fiber material needed for the repair/strengthening. The amount of unidirectional carbon fiber may be determined based on the type and/or extent of damage (e.g., the type of crack, amount of bowing) and/or the strengthening desired. In one embodiment, the unidirectional carbon fiber may be in the form of various sized sheets. In one embodiment, each sheet may be 6" wide, 1' wide, or 2' wide.

In one embodiment, the sheet width is based, at least in part, on need. The dimensions of the sheets can be customized. In one representative example, a 6" wide sheet may be used on walls with minimal bowing. A 1' wide sheet may be used for standard repairs and can be used on a wall with minimal bowing. For more significant defects, a 2' wide sheet may be used. For example, where bowing approaches 2", the 2' wide sheet may be appropriate. It is to be appreciated that these dimensions are examples only and that other dimensions are included within the scope of the innovation and the claims.

In one embodiment, the length of the sheet may depend on the needs associated with the repair/strengthening. For example, the length may be determined by factors such as the size or location of the crack/defect to be repaired and/or the size of the wall. For example, if the wall is 8' in height, the crack is at the frost line, and the wall has a minimal deflection of 0.5", a 1'×5' or 1'×6' sheet may be used. This would not cover the full height of the wall, but would provide the strength needed for the repair. If the defect were more significant (e.g., the wall has greater deflection and/or the crack is wider) the sheet may cover the full height of the wall. It should be understood by one skilled in the art that the aforementioned dimensions should be considered a minimal set of dimensions, and that any alternative dimensions may be employed in accordance with the system of the present innovation depending on the specific requirements of a particular application, such as but not limited to up to about 15' by 15', or any variations thereof. In other words, the particular dimensions may be customized based on the specific requirements or needs of a particular application of the system of the present innovation.

In one embodiment, determining 115 the location of where the sheets will be installed may depend on the type and/or orientation of any defect. Generally, the sheets are installed perpendicular or substantially perpendicular to the direction of the defect. For example, if a crack runs substantially horizontally across an area of the structure, the sheet is placed vertically (see, e.g., FIGS. 1A and 2). If a crack runs substantially vertical across an area of the structure, the sheet is placed horizontally (see, e.g., FIGS. 1C and 4). In the case of a stair-step crack sheets may be applied both vertically and horizontally in a more-or-less cross-shape (e.g., FIG. 1B and FIG. 4).

In one embodiment, sheet size may depend on the type of crack/defect. For example, where there are multiple vertical cracks, the size of the sheet (e.g., the length) may depend on the number of cracks and the distance between them. In one embodiment, a 1'×5' or 2' sheet may be applied horizontally to repair multiple vertical cracks. In one example, if there are two vertical cracks side by side (e.g., 1' or so a part) a 1'×7' sheet may be applied horizontally to cover both cracks with one sheet. As will be appreciated, there are quite a few variables that come into play when determining the size of the sheet. The examples provided are not intended to be limiting.

The calculation 110 of the amount of unidirectional carbon fiber may thus be a calculation of the number of carbon sheets for the repair/strengthening. Table 2 provides suggestions for the number of carbon fiber sheets for a given length of a wall. These suggestions for the number of sheets may be the minimum number of sheets needed for a given application.

Additional sheets may be necessary depending on various factors, including the severity of damage and geometry of the crack. For example, the size of the sheet and the number of the sheets may be determined by the width of a crack, deflection of the wall, and the source of the defect. In one embodiment in which more than one carbon fiber sheet is used, the maximum distance between the carbon sheets may be no greater than about 4 feet. In one example, an 18 ft wall may require 4 sheets (or more) with no more than about 4 ft between each sheet. Placement of the sheets is determined by the area most in need of correction/repair or where the greatest stress is located. As described above, extra sheets may be necessary for stair-step cracks.

In one embodiment, deflection may be measured (e.g., using a plumb bob) to assess the most effective repair/strengthening installation. In one embodiment, where the deflection is 2" or less, the installation method is as described herein. In one embodiment, where the deflection is greater than 2", a pushback may be necessary prior to installation of the epoxy/resin structural strengthening system described herein.

TABLE 2

| Suggested number of unidirectional carbon fiber sheets based on wall length | |
|---|---|
| Length of the Wall (Feet) | Recommended Number of Sheets |
| 2' Wide | |
| 2-10 | 2 |
| 11-22 | 4 |
| 23-34 | 6 |
| 35-46 | 8 |
| 47-58 | 10 |
| 59-70 | 12 |
| 71-82 | 14 |
| 83-94 | 16 |

9

TABLE 2-continued

Suggested number of unidirectional carbon
fiber sheets based on wall length

| Length of the Wall (Feet) | Recommended Number of Sheets |
|---|---|
| 1' Wide | |
| 1-8 | 2 |
| 9-18 | 4 |
| 19-28 | 6 |
| 29-38 | 8 |
| 39-48 | 10 |
| 49-58 | 12 |
| 59-68 | 14 |
| 69-78 | 16 |
| 6" Wide | |
| 1-7 | 2 |
| 8-16 | 4 |
| 17-25 | 6 |
| 26-34 | 8 |
| 35-43 | 10 |
| 44-52 | 12 |
| 53-61 | 14 |
| 62-70 | 16 |

Figure 6:
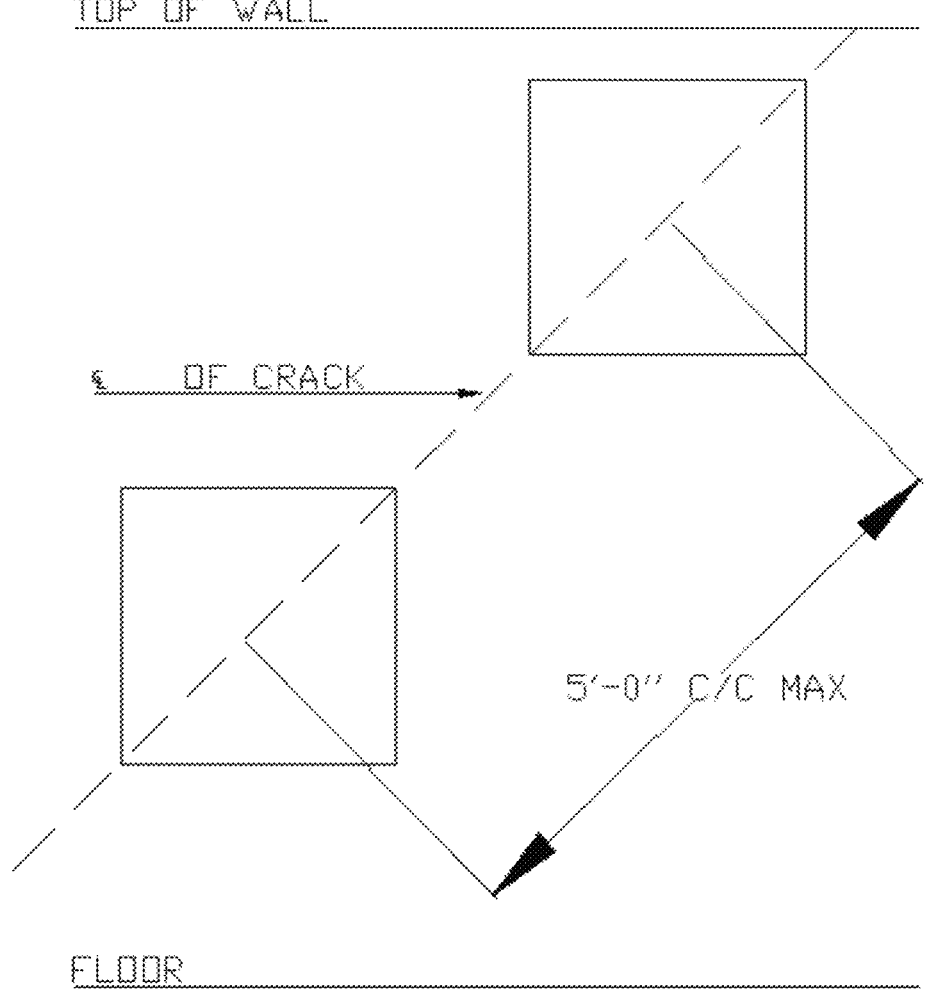
FIG. 6 is an illustration of the configuration of unidirectional carbon fiber material according to an embodiment of the innovation used to repair a diagonal crack.

The method may further include determining the configuration of the unidirectional carbon fiber for the repair strengthening. FIGS. 1-4 and 6-7 depict examples of configurations of the unidirectional carbon fiber based on the type of defect to be repaired. FIGS. 1A and 2 depict horizontal cracks; FIGS. 1B and 4 depict stair-step cracks; FIGS. 1C and 3 depict vertical cracks; and FIGS. 6 and 7 depict diagonal cracks.

Based on the amount (e.g., the number of carbon fiber sheets) and configuration of the carbon fiber, the method may further include preparing a portion of the surface (e.g., wall) for application of an epoxy/resin system and the unidirectional carbon fiber material. The method may include measuring and marking an area of the surface that is greater than the area need to apply the unidirectional carbon fiber. Where sheets of carbon fiber material are used, the method may include measuring and marking an area of the surface that provides 1" around each sheet location 120 (e.g., 1" wider than and 1" above and below each sheet).

The method may further include preparing the section of measured surface 125 (e.g., wall) for application of the epoxy/resin structural strengthening system and the unidirectional carbon fiber material. The wall may be prepared by scraping/cleaning the area. In one embodiment, the wall may be prepared by scraping the measured area to remove debris, including paint. In one embodiment, the scraping may be mechanical abrading. In one embodiment, a sander may be used. In another embodiment, the sander may be a diamond-tip sander. It is understood that any type of preparing a surface (e.g., a wall) for application of materials (e.g., repair materials, paint, etc.) may be used and is included with the scope of the innovation.

Once a suitable area for application of the epoxy/resin structural strengthening system and the unidirectional carbon fiber material is completed, the method may further include preparing an epoxy paste filler. In one embodiment, the epoxy paste filler is prepared 130 as described above. The prepared amount should be enough to fill all the damaged portions of the prepared area (e.g., cracks, holes, dents, etc.). It should be understood to one skilled in the art that an appropriate cement product that is conventional in the art, such as, but not limited to, a hydraulic cement, may be employed prior to application of the epoxy paste filler if, for example, cracks are relatively larger, if spalding is occurring, or the like.

In one embodiment, the method may include applying 135 the epoxy paste filler to cover/fill the defects located within the prepared area. In one embodiment, the edges of the applied epoxy paste filler may be feathered. It is to be understood that most any means for application of the epoxy paste filler may be used according to the innovation.

In one embodiment, the method may further include preparing 145 a primer. In one embodiment, the primer may be prepared as described above.

The method may include applying 150 a coat of the primer to the prepared area after the epoxy paste filler has had some time to set 140 (e.g., time to thicken). In one embodiment, the primer is applied within about 10 to 15 minutes after application of the epoxy paste filler, or even minimal to no wait time as a wet-on-wet application. In one embodiment, the primer may be applied via a roller. In one embodiment, the coat of primer is a thick coat. In one embodiment, the primer may be allowed to set and absorb into the porous surface of the prepared area 155. In one embodiment, the primer may be allowed to set for about 10 to 15 minutes, or even minimal to no wait time as a wet-on-wet application.

In one embodiment, the method may include the preparation 160 and application 165 of a bonding adhesive/saturant over the primer. In one embodiment, the primer may be tacky when the bonding adhesive is applied. In one embodiment, the bonding adhesive/saturant may be applied immediately after application of the primer. In one embodiment the bonding adhesive/saturant is prepared as described above.

The carbon fiber may be applied 170 after the first coat of bonding saturant has been applied 165 and is followed by another coat of bonding saturant 180. The carbon fiber may be pre-cut carbon-fiber sheets. The first coat of bonding saturant may be used to adhere the carbon fiber to the structure. In one embodiment, the carbon fiber may be applied to a wall by hand. In one embodiment, a roller (e.g., a ribbed roller) may be used afterwards 175 to help press out any air bubbles, and to work the bonding saturant into the fibers of the system as part of the encapsulation. After application 180 of a second coat of the bonding adhesive/saturant, the roller (or other device) may be used again 185.

In one embodiment, after application of the epoxy/resin structural strengthening system, the structure may be painted or covered over, such as with drywall, after about 48-72 hours to be fully cured. In one embodiment, once painted the epoxy/resin structural strengthening system may be undetectable or nearly undetectable to a person viewing the structure.

While the innovation has been described with reference to various exemplary embodiments, it will be appreciated that modifications may occur to those skilled in the art, and the present application is intended to cover such modifications and innovations as fall within the spirit of the innovation.

What is claimed is:

1. A system for repairing and/or strengthening a porous structure comprising:
   a paste filler applied to a surface of the porous structure;
   a primer applied to the paste filler;
   a first saturant applied to the primer and the paste filler;
   a unidirectional carbon fiber material applied to the first saturant, over the paste filler and the primer; and
   a second saturant applied to said unidirectional carbon fiber material;

wherein a roller device is applied to said first saturant and said second saturant for removing air bubbles from said first saturant and said second saturant, wherein the unidirectional carbon fiber material is formed into a first sheet and a second sheet, the second sheet is applied over the first sheet in an orientation along the surface that is perpendicular to the first sheet, the first sheet and the second sheet each extend across a crack in the surface, each of the first sheet and the second sheet has a first surface and a second surface opposite the first surface, the first surface of the first sheet and the first surface of the second sheet each face a surface of the porous structure, each of the first sheet and the second sheet cover portions of the surface of the porous structure on opposite sides of the crack, and the first surface of the second sheet covers the second surface of the first sheet.

2. The system of claim 1 further comprising a hydraulic cement or an expandable foam applied to another crack in the surface.

3. The system of claim 1, wherein the paste filler is a high viscosity epoxy paste that comprises a 100% solids non sag epoxy paste.

4. The system of claim 1, wherein the primer comprises a low viscosity polyamine resin that penetrates and cures inside of the porous structure.

5. The system of claim 1, wherein the first saturant comprises an encapsulation resin.

6. The system of claim 1, wherein the primer comprises a resin component and a hardener component.

7. The system of claim 1, wherein the unidirectional carbon fiber material comprises:

a plurality of carbon fibers, each comprising a high strength modulus fiber having a weight in the range of about 4 oz/sq yd to about 11 oz/sq yd, wherein the plurality of carbon fibers are in a parallel alignment, and wherein the unidirectional carbon fiber material has a tensile strength of at least about 370 ksi.

8. The system of claim 7, wherein each carbon fiber has a weight of about 11 oz/sq yd.

9. The system of claim 7 wherein the unidirectional carbon fiber material has a tensile modulus of at least about 20 Msi.

10. The system of claim 1, wherein the primer is applied to the paste filler before the paste filler fully dries, and the first saturant is applied to the paste filler and the primer before the primer fully dries.

11. The system of claim 1, wherein said second saturant is applied to the unidirectional carbon fiber material, over the first saturant, the paste filler and the primer, and the surface in that order.

12. The system of claim 11, wherein the second saturant impregnates and encapsulates the unidirectional carbon fiber material with the first saturant.

13. The system of claim 11, wherein the first saturant and the second saturant are formed from a same resin material.

14. The system of claim 11, wherein the second saturant is applied to the unidirectional carbon fiber material before the first saturant fully dries.

* * * * *